US011020646B2

(12) United States Patent
Okada

(10) Patent No.: US 11,020,646 B2
(45) Date of Patent: Jun. 1, 2021

(54) MEASURING DEVICE, CONTROL METHOD

(71) Applicant: CASIO COMPUTER CO., LTD., Tokyo (JP)

(72) Inventor: Takeshi Okada, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 338 days.

(21) Appl. No.: 16/140,660

(22) Filed: Sep. 25, 2018

(65) Prior Publication Data
US 2019/0091543 A1 Mar. 28, 2019

(30) Foreign Application Priority Data

Sep. 27, 2017 (JP) .............................. JP2017-186291

(51) Int. Cl.
*A63B 71/06* (2006.01)
*G06F 1/16* (2006.01)
(Continued)

(52) U.S. Cl.
CPC ............ *A63B 71/0619* (2013.01); *A63B 1/00* (2013.01); *A63B 69/0093* (2013.01);
(Continued)

(58) Field of Classification Search
CPC ....... A63B 71/0619; A63B 1/00; A63B 71/02; A63B 69/0093; A63B 2225/60;
(Continued)

(56) References Cited

U.S. PATENT DOCUMENTS 4,783,772 A 11/1988 Umemoto et al.
7,144,285 B1 * 12/2006 Hendricks ............... B63B 32/60
441/74
(Continued)

FOREIGN PATENT DOCUMENTS

CN 105030243 A 11/2015
JP H08-101287 A 4/1996
(Continued)

OTHER PUBLICATIONS

Notice of Reasons for Refusal dated Jan. 21, 2020 received in Japanese Patent Application No. JP 2017-186291 together with an English language translation.
(Continued)

*Primary Examiner* — Mohammad K Islam
(74) *Attorney, Agent, or Firm* — Scully Scott Murphy & Presser

(57) ABSTRACT

Measurement accuracy in sports is improved. A wrist terminal includes a measurement information acquiring unit, a reference atmospheric pressure setting unit, and a state determining unit. The reference atmospheric pressure setting unit sets a reference atmospheric pressure. The state determining unit determines that the wrist terminal is located over water when a difference between the reference atmospheric pressure and a current atmospheric pressure after starting sports is within a predetermined atmospheric pressure range and the wrist terminal is located under water when the difference is outside the predetermined atmospheric pressure range. The measurement information acquiring unit 51 performs predetermined measurement on the basis of the determination result from the state determining unit 54.

20 Claims, 5 Drawing Sheets

(51) Int. Cl.
   *A63B 71/02* (2006.01)
   *A63B 69/00* (2006.01)
   *A63B 1/00* (2006.01)

(52) U.S. Cl.
   CPC .............. *A63B 71/02* (2013.01); *G06F 1/163* (2013.01); *G06F 1/1656* (2013.01); *A63B 2071/0663* (2013.01); *A63B 2220/74* (2013.01); *A63B 2225/60* (2013.01)

(58) Field of Classification Search
   CPC ........ A63B 2220/74; A63B 2071/0663; A63B 2220/40; A63B 2069/185; A63B 2220/62; A63B 2220/836; A63B 24/0062; A63B 2024/0025; A63B 2024/0071; A63B 2208/03; A63B 2220/17; A63B 2220/20; A63B 2220/22; A63B 2220/30; A63B 2220/806; A63B 2225/50; A63B 24/0021; A63B 31/10; A63B 69/12; A63B 69/18; A63B 71/0605; A63B 71/10; G06F 1/1656; G06F 1/163; A63C 17/01; A63C 17/12; A63C 2203/18; A63C 2203/22; B63B 32/10; B63B 32/70; B63B 45/00; B63B 45/04; B63B 1/24; B63B 1/242; B63B 1/285; B63B 1/286; B63B 2022/066; B63B 22/00; B63B 2201/26; B63B 2211/00; B63B 32/00; B63B 32/60; B63B 34/20; B63B 34/26; B63B 2009/0088; B63B 11/49
   See application file for complete search history.

(56) References Cited

U.S. PATENT DOCUMENTS

| | | | |
|---|---|---|---|
| 9,473,697 B2* | 10/2016 | Jeung | H04N 5/23296 |
| 9,607,506 B1* | 3/2017 | Manning | A63C 17/12 |
| 9,697,743 B2* | 7/2017 | Regan | A61B 5/6895 |
| 9,738,355 B1* | 8/2017 | Thorson | B63C 11/49 |
| 10,184,856 B2* | 1/2019 | Ueno | G01B 21/18 |
| 10,806,968 B2* | 10/2020 | Miyasaka | A63B 24/0062 |
| 2006/0167649 A1* | 7/2006 | Alexander | A63F 13/211 |
| | | | 702/160 |
| 2007/0061107 A1* | 3/2007 | Vock | G01P 3/50 |
| | | | 702/182 |
| 2007/0130795 A1* | 6/2007 | King | A63B 31/10 |
| | | | 36/11.5 |
| 2008/0262666 A1* | 10/2008 | Manning | G01C 13/002 |
| | | | 701/21 |
| 2017/0032693 A1* | 2/2017 | Regan | A63B 69/0093 |
| 2020/0064781 A1* | 2/2020 | Shim | G04G 19/12 |

FOREIGN PATENT DOCUMENTS

| | | |
|---|---|---|
| JP | 2014-171057 A | 9/2014 |
| JP | 2014-180036 A | 9/2014 |
| JP | 2016-042079 A | 3/2016 |
| JP | 2017-049090 A | 3/2017 |
| JP | 6178820 B2 | 8/2017 |
| JP | 2017-169214 A | 9/2017 |

OTHER PUBLICATIONS

First Office Action dated Apr. 23, 2020 received in Chinese Patent Application No. CN201811131834.0 together with an English language translation.

* cited by examiner

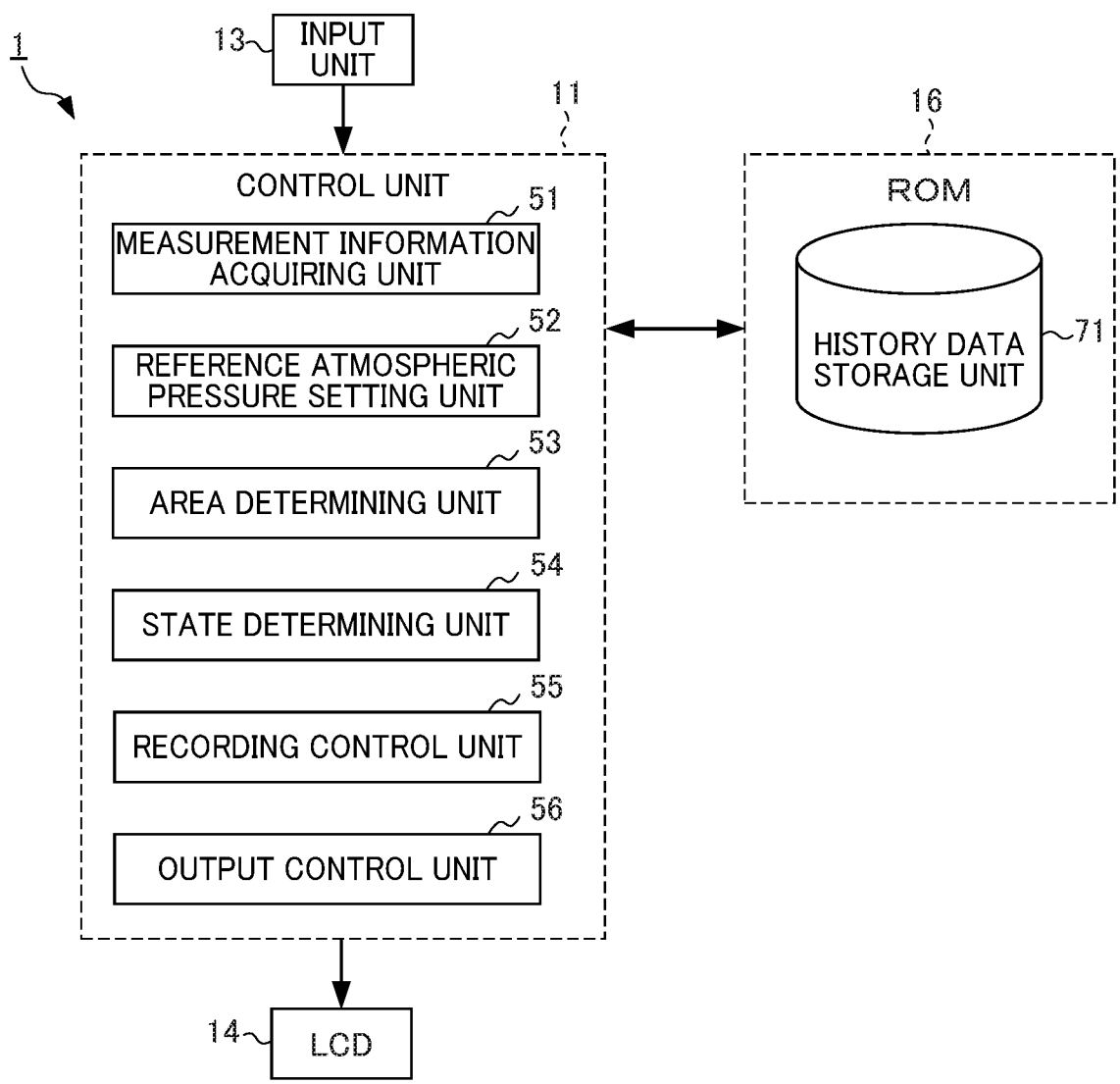

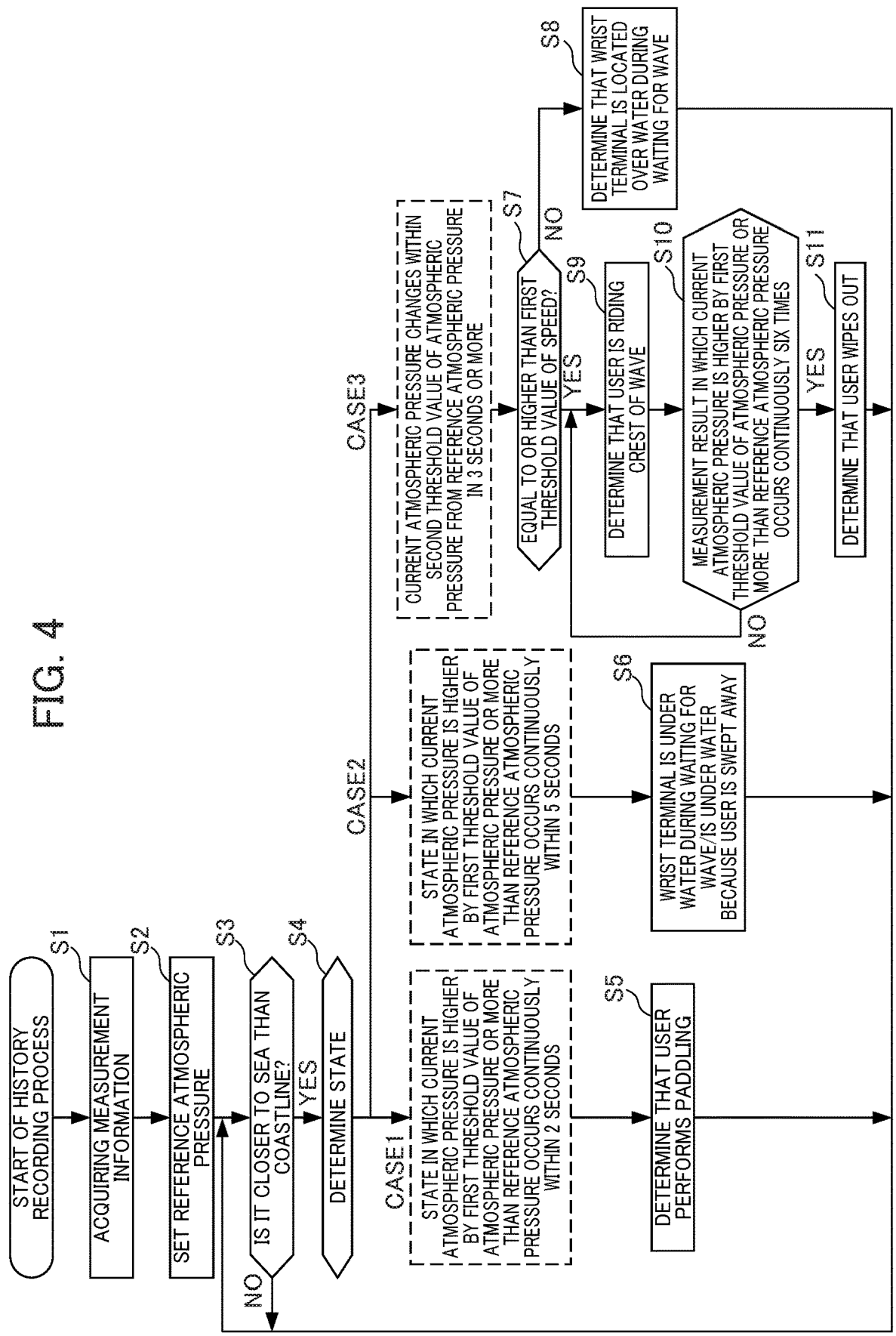

MEASURING DEVICE, CONTROL METHOD

CROSS-REFERENCE TO RELATED APPLICATIONS

This application is based upon and claims the benefit of priority under 35 USC 119 of Japanese Patent Application No. 2017-186291 filed on Sep. 27, 2017 the entire disclosure of which, including the description, claims, drawings, and abstract, is incorporated herein by reference in its entirety.

BACKGROUND OF THE INVENTION

1. Field of the Invention

The present invention relates to a measuring device, a control method.

2. Description of the Related Art

In the related art, techniques of attaching a device having a sensor built therein to a body and measuring various data in sports are known in sports such as surfing, a body board, or a paddle board.

For example, in Patent Document 1, a system that displays current surfing information on a device which is worn by a user, tracks physical surfing activities of the user, and issues an alert to a user when preset surfing conditions and the like are satisfied.

Patent Document 1: Japanese Unexamined Patent Application, Publication No. 2016-42079

BRIEF SUMMARY OF THE INVENTION

One aspect of the embodiment is a measuring device that includes a CPU and a memory and is suitable for use in sports, the measuring device comprising an atmospheric pressure sensor that detects an atmospheric pressure at a current position of a user as a reference atmospheric pressure in response to a setting operation from the user before starting the sports, wherein the CPU performs in accordance with a program stored in a program memory: storing the reference atmospheric pressure detected by the atmospheric pressure sensor in the memory; determining that the measuring device is located over water when a difference between the stored reference atmospheric pressure and a current atmospheric pressure after starting the sports is within a predetermined atmospheric pressure range and the measuring device is located under water when the difference is outside the predetermined atmospheric pressure range; and performing predetermined measurement on the basis of the determination result.

BRIEF DESCRIPTION OF THE SEVERAL VIEWS OF THE DRAWING

FIG. 2 is a functional block diagram illustrating a functional configuration for performing a history recording process in a functional configuration of the wrist terminal illustrated in FIGS. 1A and 1B.

FIG. 4 is a flowchart illustrating a flow of a history recording process which is performed by the wrist terminal illustrated in FIGS. 1A and 1B and having the functional configuration illustrated in FIG. 2.

DETAILED DESCRIPTION OF THE INVENTION

Embodiments of the present invention will be explained with reference to the drawings Hereinafter, an embodiment of the present invention will be described with reference to the accompanying drawings.

[Hardware Configuration]

Figure 1A:
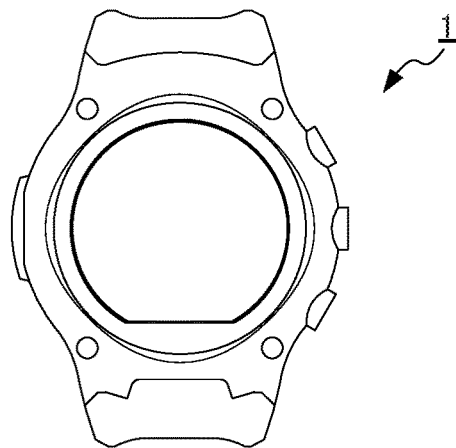
FIG. 1A is a diagram illustrating an outer configuration of a wrist terminal as a measuring device according to an embodiment of the present invention.
Figure 1B:
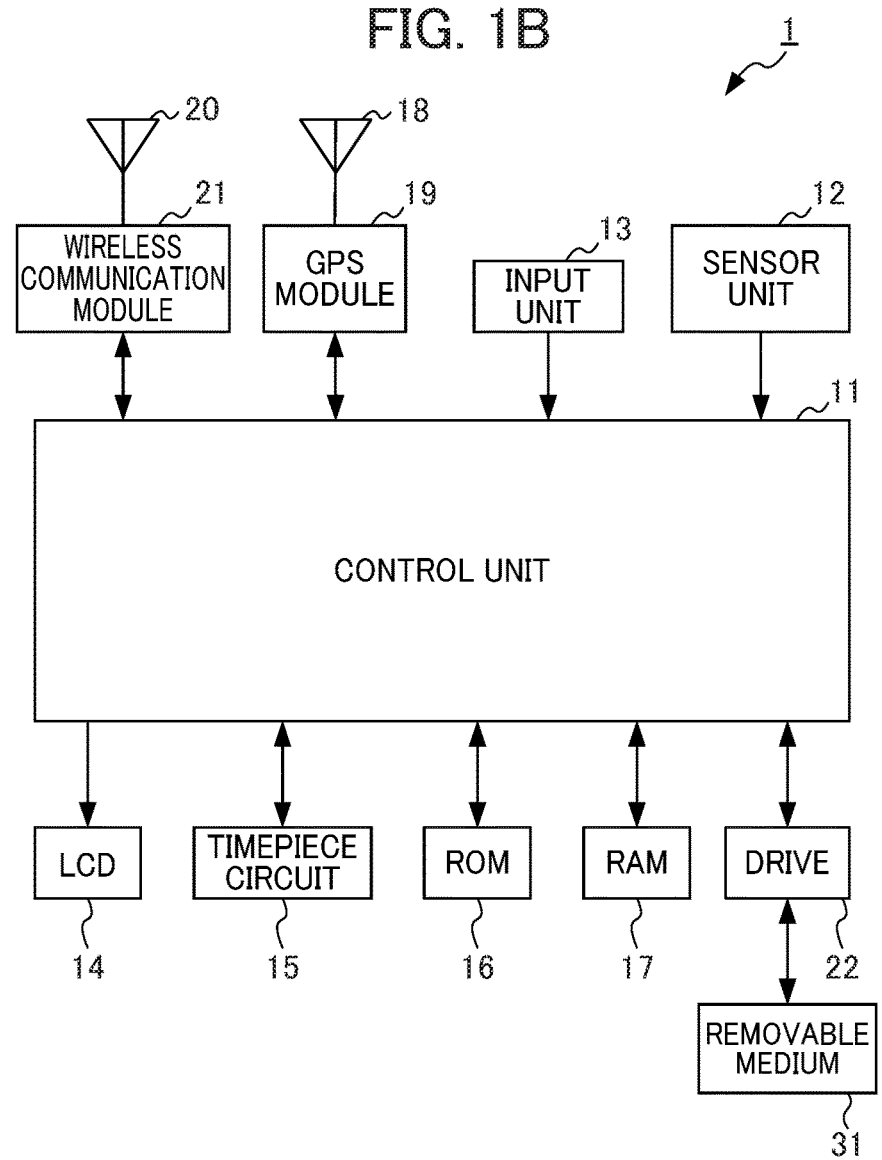
FIG. 1B is a block diagram illustrating a hardware configuration of a wrist terminal as a measuring device according to an embodiment of the present invention.

FIG. 1A is a diagram illustrating an outer configuration of a wrist terminal 1 as a measuring device according to an embodiment of the present invention and FIG. 1B is a block diagram illustrating a hardware configuration of the wrist terminal 1 as a measuring device according to the embodiment of the present invention. The wrist terminal 1 is a device that has a wrist watch shape and has a function similar to a smartphone. As illustrated in FIGS. 1A and 1B, the wrist terminal 1 includes a control unit 11, a sensor unit 12, an input unit 13, a liquid crystal display (LCD) 14, a timepiece circuit 15, a read only memory (ROM) 16, a random access memory (RAM) 17, a global positioning system (GPS) antenna 18, a GPS module 19, a wireless communication antenna 20, a wireless communication module 21, and a drive 22. The wrist terminal 1 may appropriately include another hardware such as an imaging unit.

The control unit 11 is constituted by an arithmetic operation device such as a central processing unit (CPU) and controls the whole operation of the wrist terminal 1. For example, the control unit 11 performs various processes in accordance with a program recorded in the ROM 16 such as a program for a history recording process (which will be described later). The sensor unit 12 includes various sensors such as an acceleration sensor, a gyro sensor, an atmospheric pressure sensor, a geomagnetic sensor, and an altitude sensor. The acceleration sensor detects accelerations in three-axis directions in the wrist terminal 1 and outputs information indicating the detected accelerations to the control unit 11. The gyro sensor detects angular velocities in three-axis directions in the wrist terminal 1 and outputs information indicating the detected angular velocities to the control unit 11. The atmospheric pressure sensor detects an atmospheric pressure in the environment in which the wrist terminal 1 is placed and outputs information indicating the detected atmospheric pressure to the control unit 11. In this embodiment, the atmospheric pressure sensor detects an atmospheric pressure over water (in the sky) and detects a water pressure under water.

The input unit 13 includes various buttons or a capacitance type or resistive membrane type position input sensor which is stacked on a display area of the LCD 14 and inputs a variety of information in response to a user's instruction operation. The LCD 14 outputs an image in response to an instruction from the control unit 11. For example, the LCD 14 displays various images or a screen of a user interface. In this embodiment, the position input sensor of the input unit 13 is superimposed on the LCD 14 to constitute a touch panel. The timepiece circuit 15 generates a time signal from a signal generated by a system clock or an oscillator and outputs a current time.

The ROM 16 stores information of a control program or the like which is executed by the control unit 11. The RAM 17 provides a work area when the control unit 11 performs various processes. The GPS antenna 18 receives radio waves emitted from satellites in a GPS, converts the received radio waves into an electrical signal, and outputs the converted electrical signal (hereinafter referred to as a "GPS signal") to the GPS module 19. The GPS module 19 detects a position of the wrist terminal 1 (latitude, longitude, and altitude) and the current time indicated by the GPS on the basis of the GPS signal input from the GPS antenna 18. The GPS module 19 outputs information indicating the detected position and the detected current time to the control unit 11.

The wireless communication antenna 20 is an antenna that can receive radio waves of frequencies corresponding to wireless communication which is used by the wireless communication module 21, and includes, for example, a roof antenna or a rod antenna. The wireless communication antenna 20 transmits an electrical signal of wireless communication input from the wireless communication module 21 as electromagnetic waves or converts received electromagnetic waves into an electrical signal and outputs the electrical signal to the wireless communication module 21. The wireless communication module 21 transmits a signal to another device via the wireless communication antenna 20 in accordance with an instruction from the control unit 11. The wireless communication module 21 receives a signal transmitted from another device and outputs information indicted by the received signal to the control unit 11. A removable medium 31 such as a magnetic disk, an optical disc, a magneto-optical disk, or a semiconductor memory is appropriately attached to the drive 22. The removable medium 31 can store various data such as data of position and altitude.

FIG. 2 is a functional block diagram illustrating a functional configuration for performing a history recording process in the functional configuration of the wrist terminal 1 illustrated in FIGS. 1A and 1B. The history recording process refers to a series of processes of determining a submerging state of the wrist terminal 1 and controlling recording of a history of water sports by setting an atmospheric pressure serving as a reference (a reference atmospheric pressure) and detecting a variation from the reference atmospheric pressure when a user having the wrist terminal 1 attached thereto enjoys water sports. In this embodiment, an example in which a history when a user having the wrist terminal 1 attached thereto enjoys surfing is recorded will be described. In the following description, an action of a surfer riding the crest of a wave and standing up on a surfboard is referred to as "take-off," an action of the surfer getting off the surfboard due to brake of the wave or the like is referred to as "wipe-out," and an action state of the surfer riding the crest of the wave from take-off to wipe-out is referred to as "riding."

When the history recording process is performed, a measurement information acquiring unit 51, a reference atmospheric pressure setting unit 52, an area determining unit 53, a state determining unit 54, a recording control unit 55, and an output control unit 56 are activated in the control unit 11, as illustrated in FIG. 2. A history data storage unit 71 is set in one area of the ROM 16. Riding history data for each ride of surfing is stored in the history data storage unit 71. In this embodiment, a riding track, a top speed, a distance of one riding, a time of one riding, a take-off time, and the like are stored as riding history data. One riding is counted as "one."

The measurement information acquiring unit 51 acquires a positioning result from the GPS module 19 and detection results from various sensors included in the sensor unit 12 (hereinafter collectively referred to as "measurement information") at predetermined time intervals (for example, intervals of 0.1 seconds). For example, the measurement information acquiring unit 51 sequentially acquires the positioning result (the current position) from the GPS module 19 and the detection result from the atmospheric pressure sensor of the sensor unit 12 as the measurement information. In this embodiment, the measurement information includes data obtained by appropriately applying a predetermined arithmetic operation (such as differential) to data output from the sensors. For example, data of a speed acquired by differentiating the positioning result from the GPS module 19 is included in the measurement information.

The reference atmospheric pressure setting unit 52 sets an atmospheric pressure detected at the current position of the user as a reference atmospheric pressure in response to the user's setting operation. The reference atmospheric pressure is set at a timing at which the wrist terminal 1 is over water before the user submerges in the sea or when the user is over water. The reference atmospheric pressure setting unit 52 updates the reference atmospheric pressure to the current atmospheric pressure when the state determining unit 54 determines that the user locates the wrist terminal 1 above the water level while waiting a wave. The area determining unit 53 determines whether the position of the user is located closer to the sea or closer to the land than the coastline on the basis of the measurement information acquired by the measurement information acquiring unit 51. The area determining unit 53 may determine that the position of the user is located closer to the sea than the coastline when it is determined that the user is floating over the wave on the basis of the measurement information acquired by the measurement information acquiring unit 51.

The state determining unit 54 determines a state of the user having the wrist terminal 1 attached thereto on the basis of the measurement information acquired by the measurement information acquiring unit 51. For example, when a state in which the detection result from the atmospheric pressure sensor is higher by a preset first threshold value Pth1 of the atmospheric pressure (set to 10 atm here) than the reference atmospheric pressure occurs continuously within 2 seconds, the state determining unit 54 determines that the user performs paddling. When the state in which the detection result from the atmospheric pressure sensor is higher by a preset first threshold value Pth1 of the atmospheric pressure than the reference atmospheric pressure occurs continuously in 5 seconds or more, the state determining unit 54 determines that the user is in a state in which the wrist terminal 1 is under water during waiting for a wave or a state in which the user is swept away and the wrist terminal 1 is under water.

When the detection result from the atmospheric pressure sensor changes within a preset second threshold value Pth2 of the atmospheric pressure (set to 2 atm) from the reference atmospheric pressure in 3 seconds or more, the state determining unit 54 determines that the user is in a state in which the user is riding the crest of the wave (a take-off state) or in a state in which the wrist terminal 1 locates over water during waiting for a wave. At this time, the state determining unit 54 determines whether a moving speed is equal to or higher than a first threshold value Vth1 of the speed (for example, 10 [km/s]), and determines that the user is riding the crest of the wave (the take-off state) when the moving speed is equal to or higher than the first threshold value Vth1 of the speed. On the other hand, when the moving speed is not equal to or higher than the first threshold value Vth1 of the speed, the state determining unit 54 determines that the user locates the wrist terminal 1 over water during waiting a wave.

The state determining unit 54 determines, in a state in which the user is riding the crest of the wave, whether a measurement result in which the detection result from the atmospheric pressure sensor is equal to or higher by the preset first threshold value Pth1 of the atmospheric pressure than the reference atmospheric pressure occurs continuously six times or more (for example, is maintained for 0.6 seconds), and determines that the user having the wrist terminal 1 attached thereto wipes out (submerges in the sea) when the measurement result in which the detection result from the atmospheric pressure sensor is equal to or higher by the preset first threshold value Pth1 of the atmospheric pressure than the reference atmospheric pressure occurs continuously six times. On the other hand, when the measurement result in which the detection result from the atmospheric pressure sensor is equal to or higher by the preset first threshold value Pth1 of the atmospheric pressure than the reference atmospheric pressure does not occur continuously six times, the state determining unit 54 determines that the state in which the user is riding the crest of a wave is maintained.

When the wipe-out is detected, determination based on the moving speed may be performed in addition to determination based on the atmospheric pressure. For example, depending on whether the moving speed is lower than a second threshold value Vth2 of the speed (for example, 2 [km/s]) lower than the first threshold value Vth1 of the speed, it is possible to determine whether the user having the wrist terminal 1 attached thereto wipes out. By taking a logical sum or a logical product with reference to the results of the determination based on the atmospheric pressure and the determination based on the moving speed, it is possible to comprehensively determine that the user having the wrist terminal 1 attached thereto wipes out. The first threshold value Pth1 of the atmospheric pressure, the second threshold value Pth2 of the atmospheric pressure, the first threshold value Vth1 of the speed, and the second threshold value Vth2 of the speed can be arbitrarily set by the user by operating the wrist terminal 1.

When the state determining unit 54 detects that the user takes off, the recording control unit 55 records (stores) the measurement information acquired by the measurement information acquiring unit 51 in the ROM 16 or the removable medium 31 attached to the drive 22. When the state determining unit 54 detects that the user is wiped off, the recording control unit 55 stops recording (storing) of the measurement information acquired by the measurement information acquiring unit 51 in the ROM 16 or the removable medium 31 attached to the drive 22.

When the state determining unit 54 detects that the user takes off, the output control unit 56 displays predetermined measurement information as data under measurement on the LCD 14. When an instruction to display a map screen of history data is issued by the user, the output control unit 56 displays the map screen in which a movement track for each riding is expressed on a map on the LCD 14 on the basis of the measurement information recorded in the ROM 16 or the removable medium 31 by the recording control unit 55.

Figure 3:
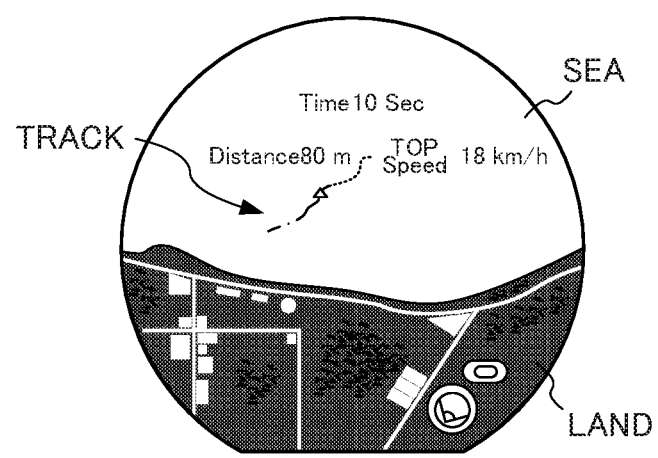
FIG. 3 is a schematic diagram illustrating an example of a map screen in which a riding track of each riding is expressed on a map.

FIG. 3 is a schematic diagram illustrating an example of the map screen in which a riding track of each riding is expressed on a map. As illustrated in FIG. 3, on the map screen, a line indicating a movement track from a start position (a take-off position) of one riding to an end position (a wipe-out position) as a riding track is displayed in the background of a coast map near the current position. In the line displayed on the map screen, a position with a maximum speed in the riding is displayed to be distinguished by a mark, and a speed state at each position is displayed to be distinguished by a difference in color of the line. For example, a position at which the speed is lower than 20% of the maximum speed may be expressed in blue, a position at which the speed is equal to or higher than 20% and lower than 40% of the maximum speed may be expressed in light blue, a position at which the speed is equal to or higher than 40% and lower than 60% of the maximum speed may be expressed in green, a position at which the speed is equal to or higher than 60% and lower than 80% of the maximum speed may be expressed in yellow, and a position at which the speed is equal to or higher than 80% of the maximum speed may be expressed in red. In FIG. 3, the speed states at the positions are schematically illustrated by different types of lines.

[Operations]

The operation of the wrist terminal 1 will be described below. FIG. 4 is a flowchart illustrating a flow of the history recording process which is performed by the wrist terminal 1 illustrated in FIGS. 1A and 1B and having the functional configuration illustrated in FIG. 2. The history recording process is started when an operation of setting a mode in which surfing is measured (a surfing mode) is performed from a plurality of measurement modes which are prepared in the wrist terminal 1.

In Step S1, the measurement information acquiring unit 51 acquires the positioning result from the GPS module 19 and the detection results (measurement information) from various sensors of the sensor unit 12. Thereafter, until the history recording process ends, the measurement information is acquired at intervals of a predetermined time (for example, intervals of 0.1 seconds). In Step S2, the reference atmospheric pressure setting unit 52 sets an atmospheric pressure detected at the current position of the user as a reference atmospheric pressure in response to the user's setting operation.

In Step S3, the area determining unit 53 determines whether the position of the user is closer to the sea than the coastline on the basis of the measurement information acquired by the measurement information acquiring unit 51. When the position of the user is closer to the sea than the coastline, the determination result of Step S3 is YES and the process flow transitions to Step S4. On the other hand, when the position of the user is closer to the land than the coastline, the determination result of Step S3 is NO and the process of Step S3 is repeated.

In Step S4, a state of the user having the wrist terminal 1 attached thereto is determined on the basis of the measurement information acquired by the measurement information acquiring unit 51. When it is determined that a state in which the detection result from the atmospheric pressure sensor is higher by a preset first threshold value (set to 10 atm here) than the reference atmospheric pressure occurs continuously within 2 seconds (Case 1), the process flow transitions to Step S5. When a state in which the detection result from the atmospheric pressure sensor is higher by the preset first threshold value or more than the reference atmospheric pressure occurs continuously in 5 seconds or more (Case 2), the process flow transitions to Step S6. When the detection result from the atmospheric pressure sensor changes within a preset second threshold value (set to 2 atm here) from the reference atmospheric pressure in 3 seconds or more (Case 3), the process flow transitions to Step S7.

In Step S5, the state determining unit 54 determines that the user performs paddling. In this case, recording of the measurement information is not performed. After Step S5, the process flow transitions to Step S3. In Step S6, the state determining unit 54 determines that the user is in a state in which the wrist terminal 1 is under water during waiting for a wave or a state in which the user is swept away by the wave and the wrist terminal 1 is under water. In this case, recording of the measurement information is not performed. After Step S6, the process flow transitions to Step S3.

In Step S7, the state determining unit 54 determines whether the moving speed is equal to or higher than a first threshold value Vth1 of the speed (for example, 10 [km/s]). When the moving speed is not equal to or higher than the first threshold value Vth1 of the speed (for example, 10 [km/s]), the determination result of Step S7 is NO and the process flow transitions to Step S8. On the other hand, when the moving speed is equal to or higher than the first threshold value Vth1 of the speed (for example, 10 [km/s]), the determination result of Step S7 is YES and the process flow transitions to Step S9.

In Step S8, the state determining unit 54 determines that the user locates the wrist terminal 1 over water during waiting for a wave. At this time, the reference atmospheric pressure setting unit 52 updates the reference atmospheric pressure to the current atmospheric pressure. After Step S8, the process flow transitions to Step S3. In Step S9, the state determining unit 54 determines that the user is riding the crest of a wave (a take-off state). At this time, the recording control unit 55 records (stores) the measurement information acquired by the measurement information acquiring unit 51 in the ROM 16 or the removable medium 31 attached to the drive 22.

In Step S10, the state determining unit 54 determines whether the measurement result in which the detection result from the atmospheric pressure sensor is higher by the preset first threshold value Pth1 of the atmospheric pressure or more than the reference atmospheric pressure occurs six times (for example, is maintained for 0.6 seconds). When the measurement result in which the detection result from the atmospheric pressure sensor is higher by the preset first threshold value or more than the reference atmospheric pressure does not occur six times, the determination result of Step S10 is NO and the process flow transitions to Step S9. On the other hand, when the measurement result in which the detection result from the atmospheric pressure sensor is higher by the preset first threshold value or more than the reference atmospheric pressure occurs six times, the determination result of Step S10 is YES and the process flow transitions to Step S11. At this time, the recording control unit 55 stops recording (storing) of the measurement information acquired by the measurement information acquiring unit 51 in the ROM 16 or the removable medium 31 attached to the drive 22.

In Step S11, the state determining unit 54 determines that the user wipes out (submerges in the sea). After Step S11, the process flow transitions to Step S3. This process flow is repeatedly performed until an operation instructing to end the history recording process is performed by the user.

Through this process flow, in the wrist terminal 1, recording of the measurement information is prevented when the wrist terminal 1 is under water, and the measurement information is recorded when the user takes off the wrist terminal 1 is over water. Accordingly, recording of history data is not performed in a state in which accuracy of the position detected by the GPS is low, and recording of history data is performed in a state in which the accuracy of the position detected by the GPS is high. Accordingly, it is possible to improve measurement accuracy in sports.

Modified Example 1

Figure 5A:
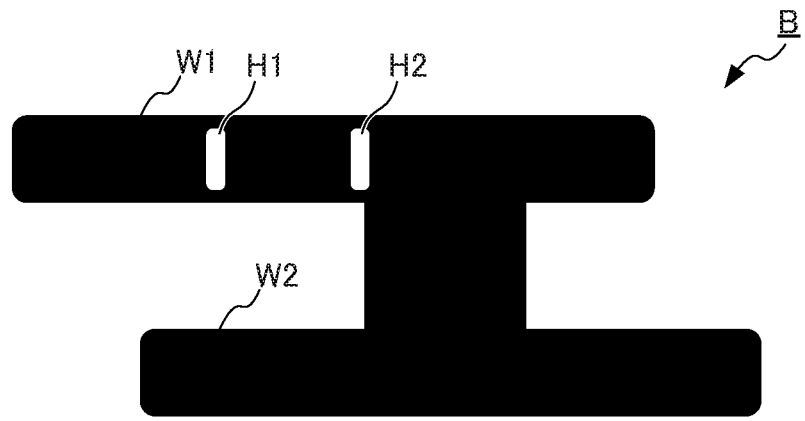
FIG. 5A is a plan view (schematic diagram) of an attachment member that is used to attach the wrist terminal to a user.
Figure 5B:
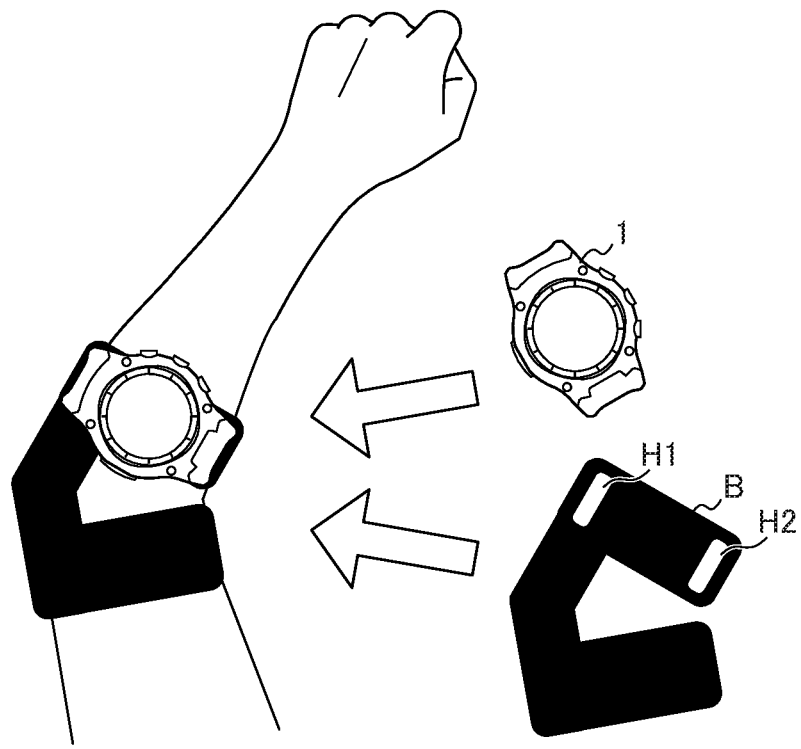
FIG. 5B is a schematic diagram illustrating a state in which the attachment member is attached to a user.

In the above-mentioned embodiment, in order to prevent a decrease in measurement accuracy of measurement information due to submergence of the wrist terminal 1, an attachment member for attaching the wrist terminal 1 to a part (the vicinity of an elbow or the like) which is less easily submerged than the arm of the user. FIG. 5A is a plan view (schematic diagram) of the attachment member B that is used to attach the wrist terminal 1 to a user. FIG. 5B is a schematic diagram illustrating a state in which the attachment member B is attached to a user. As illustrated in FIG. 5A, the attachment member B is formed of a belt-shaped member having flexibility, and includes a winding portion W1 which is wound on a lower arm of a user, a winding portion W2 which is wound on an upper arm of the user, and two belt passage holes H1 and H2 through which a belt of the wrist terminal 1 passes. The belt passage holes H1 and H2 are formed in the winding portion W1. The winding portions W1 and W2 are provided with a fixing member that can be fixed to an arbitrary position such as a hook and loop fastener.

When the wrist terminal 1 is attached using the attachment member B, the belt of the wrist terminal 1 is inserted into the belt passage holes H1 and H2 of the winding portion W1, the winding portion W1 is wound on and fixed to the user's lower arm (near the elbow), and the winding portion W2 is wound on and fixed to the user's upper arm. Accordingly, the wrist terminal 1 is fixed to the position of the lower arm. At this time, when ends of the belt of the wrist terminal 1 wound on the lower arm come into contact with each other, the ends of the belt of the wrist terminal 1 may be fixed to each other. When the wrist terminal 1 is simply wound on the lower arm, a human arm is narrowed to the wrist and thus the wrist terminal 1 moves slowly to the wrist side, but the wrist terminal 1 can be satisfactorily fixed to the position of the lower arm using the attachment member B. The belt passage holes H1 and H2 may be formed in the winding portion W2. In this case, the wrist terminal 1 is fixed to the position of the upper arm.

Modified Example 2

In the above-mentioned embodiment, the measurement information acquiring unit 51 may detect the speed on the basis of GPS signals except for a case in which the state determining unit 54 determines that the wrist terminal 1 is under water (the detection result from the atmospheric pressure sensor is higher by the first threshold value or more than the reference atmospheric pressure), and the recording control unit 55 may record the measurement information when it is determined that the detected speed is equal to or higher than the first threshold value Vth1 of the speed. Similarly, except for a case in which the state determining unit 54 determines that the wrist terminal 1 is under water (the detection result from the atmospheric pressure sensor is higher by the first threshold value or more than the reference atmospheric pressure), receiving of the GPS signals or calculating of the position information based on the GPS signals may be performed in addition to detection of the speed. In this case, processing loads of the process of receiving GPS signals, the process of calculating position information based on the GPS signals, the process of detecting a speed, and the like can be reduced.

The wrist terminal 1 having the above-mentioned configuration includes the measurement information acquiring unit 51, the reference atmospheric pressure setting unit 52, and the state determining unit 54. The reference atmospheric pressure setting unit 52 sets the reference atmospheric pressure. The state determining unit 54 determines that the wrist terminal is over water when the difference between the reference atmospheric pressure and the current atmospheric pressure is within a predetermined atmospheric pressure range and the wrist terminal is under water when the difference is outside the predetermined atmospheric pressure range. The measurement information acquiring unit 51 performs predetermined measurement on the basis of the determination result from the state determining unit 54. Accordingly, since it is possible to satisfactorily determine whether the wrist terminal 1 is over water or under water, it is possible to distinguish history data acquired when the wrist terminal 1 is under water and history data acquired when the wrist terminal 1 is over water. Accordingly, it is possible to improve measurement accuracy in sports.

The wrist terminal 1 includes an atmospheric pressure sensor in the sensor unit 12. The atmospheric pressure sensor detects an atmospheric pressure. The state determining unit 54 determines the difference between the reference atmospheric pressure and the current atmospheric pressure using the detection result detected as an atmospheric pressure over water or under water as the current atmospheric pressure. Accordingly, it is possible to determine whether the wrist terminal 1 having a function of detecting an atmospheric pressure is over water or under water.

The wrist terminal 1 includes the recording control unit 55. The recording control unit 55 performs a predetermined process when the state determining unit 54 determines that the difference between the reference atmospheric pressure and the current atmospheric pressure is within a predetermined atmospheric pressure range. Accordingly, when the wrist terminal 1 is over water, it is possible to perform a predetermined process.

The predetermined process is a process of acquiring GPS information. Accordingly, when the wrist terminal 1 is under water, it is possible to curb acquisition of GPS information.

The predetermined process is a process of acquiring position information. Accordingly, when the wrist terminal 1 is under water, it is possible to curb acquisition of position information.

The predetermined process is a process of acquiring speed information. Accordingly, when the wrist terminal 1 is under water, it is possible to curb acquisition of speed information.

When the speed information is equal to or higher than a predetermined speed, the state determining unit 54 determines that the user is riding the crest of a wave. Accordingly, it is possible to determine whether the user is riding the crest of a wave with reference to the speed.

The predetermined process is a process of recording a history when the difference between the reference atmospheric pressure and the current atmospheric pressure is within the predetermined atmospheric pressure range. Accordingly, when the wrist terminal 1 is over water, it is possible to record a history.

The wrist terminal 1 is a device which is used in water sports. Accordingly, it is possible to improve measurement accuracy in water sports.

The water sport is surfing. Accordingly, it is possible to improve measurement accuracy even in a situation in which the wrist terminal 1 frequently moves between under water and over water in surfing.

The wrist terminal 1 is a device which is used in water sports, and the history information is a track of a state in which the user is riding the crest of wave. Accordingly, it is possible to more appropriately record a riding track in surfing.

The wrist terminal 1 is a measuring device which is used in water sports, and includes the measurement information acquiring unit 51, the state determining unit 54, and the recording control unit 55. The state determining unit 54 determines whether the wrist terminal 1 is under water or over water. The measurement information acquiring unit 51 performs predetermined measurement when the state determining unit 54 determines that the wrist terminal 1 is over water. Accordingly, it is possible to reduce a processing load for causing the wrist terminal 1 to perform predetermined measurement.

The wrist terminal 1 includes the recording control unit 55. The measurement information acquiring unit 51 acquires speed information when the state determining unit 54 determines that the wrist terminal 1 is over water. When the speed information is equal to or higher than a predetermined speed, the state determining unit 54 determines that the user is riding the crest of a wave and the recording control unit 55 records history information. Accordingly, it is possible to satisfactorily determine that a user having the wrist terminal 1 attached thereto is riding the crest of a wave. Accordingly, it is possible to improve measurement accuracy in sports.

The wrist terminal 1 is a measuring device which is used in water sports and includes the measurement information acquiring unit 51, the state determining unit 54, and the recording control unit 55. The measurement information acquiring unit 51 performs predetermined measurement. The state determining unit 54 determines whether the wrist terminal 1 is over water or under water. The recording control unit 55 performs a predetermined process on the basis of the measurement result of the measurement information acquiring unit 51 at the timing at which the state determining unit 54 has determined that the wrist terminal 1 is over water. Accordingly, when the wrist terminal 1 is over water, it is possible to perform a predetermined process. Accordingly, it is possible to improve measurement accuracy in sports.

It should be noted that the present invention is not to be limited to the aforementioned embodiments, and that modifications, improvements, etc. within a scope that can achieve the objects of the present invention are also included in the present invention.

For example, in the above-mentioned embodiment, it may be determined whether a user is in a take-off state in surfing by causing the control unit 11 to determine whether the user is floating over a wave on the basis of the measurement information.

In the above-mentioned embodiment, it may be determined that a user takes off by causing the state determining unit 54 to detect that the user stands up on a surfboard from a state in which the user is floating over the wave on the basis of the measurement information. In this case, an upward acceleration due to standing up can be detected or waveforms of an acceleration and an angular velocity are different from those in the floating state can be detected.

In the above-mentioned embodiment, it may be determined that the user wipes out by causing the state determining unit 54 to detect that the user submerges in the sea from the standing-up state on the basis of the measurement information. In this case, a downward acceleration due to submerging in the sea can be detected or waveforms of an acceleration and an angular velocity are different from those in the state in which the user stands up on the surfboard can be detected.

In the above-mentioned embodiment, wipe-out conditions may be set to a condition that a state in which the speed is lower than a predetermined speed is maintained for a predetermined time or more.

Accordingly, when a turn is performed with a relatively slow wave or the like, it is possible to curb determination of that the user wipes out.

In the above-mentioned embodiment, when the map screen is displayed, the scale of the map may be set to correspond to the length of the movement track. When the map screen is displayed, the range of the map may be set such that the newest movement track is displayed in a predetermined area (in a center area or the like) on the display screen of the LCD 14.

In the above-mentioned embodiment, a plurality of movement tracks may be displayed together on the map screen.

In the above-mentioned embodiment, the GPS is used to acquire position information, but the invention is not limited thereto. For example, SiRFusion (registered trademark) in which accurate position information is acquired at a high speed using a Wi-Fi access point, a quantum compass that can measure a position under water, or the like may be used.

In the above-mentioned embodiment, a wrist terminal has been exemplified as an electronic device to which the invention is applied, but the invention is not limited thereto. For example, the invention can be generally applied to an electronic device having a function of measuring a motion. Specifically, for example, the invention can be applied to a note-type personal computer, a tablet type terminal, a video camera, a portable navigation device, a mobile phone, a smartphone, a portable game machine, and the like.

In the above-mentioned embodiment, the control unit 11 in the wrist terminal 1 controls the operations illustrated in the flowchart of FIG. 4, but a configuration in which data is sent to a smartphone or the like via the wireless communication module 21, the smartphone performs an arithmetic operation process, and the result is returned to the wrist terminal 1 and is displayed on the LCD 14 may be employed. In the above-mentioned embodiment, various data is recorded in the RAM 17 in the wrist terminal 1 or the removable medium 31, but a configuration in which data is sent to a smartphone or the like via the wireless communication module 21 and is recorded in the smartphone may be employed.

The processing sequence described above can be executed by hardware, and can also be executed by software. In other words, the hardware configuration of FIG. 2 is merely illustrative examples, and the present invention is not particularly limited thereto.

More specifically, the types of functional blocks employed to realize the above-described functions are not particularly limited to the examples shown in FIG. 2, so long as the wrist terminal 1 can be provided with the functions enabling the aforementioned processing sequence to be executed in its entirety.

A single functional block may be constituted by a single piece of hardware, a single installation of software, or a combination thereof.

The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or storage medium to a computer or the like.

The computer may be a computer equipped with dedicated hardware. In addition, the computer may be a computer capable of executing various functions, e.g., a general purpose personal computer, by installing various programs.

The storage medium containing such a program can not only be constituted by the removable medium 31 of FIG. 1B distributed separately from the device main body for supplying the program to a user, but also can be constituted by a storage medium or the like supplied to the user in a state incorporated in the device main body in advance. The removable medium 101 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, semiconductor memories, and the like included in the storage unit 52 in which the program is recorded of FIG. 1.

It should be noted that, in the present specification, the steps defining the program recorded in the storage medium include not only the processing executed in a time series following this order, but also processing executed in parallel or individually, which is not necessarily executed in a time series. Further, in this specification, the term of the system shall mean an entire apparatus composed of a plurality of apparatuses, a plurality of means and the like.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

EXPLANATION OF REFERENCE NUMERALS

1 . . . WRIST TERMINAL, 11 . . . CONTROL UNIT, 12 . . . SENSOR UNIT, 13 . . . INPUT UNIT, 14 . . . LCD, 15 . . . TIMEPIECE CIRCUIT, 16 . . . ROM, 17 . . . RAM, 18 . . . GPS ANTENNA, 19 . . . GPS MODULE, 20 . . . WIRELESS COMMUNICATION ANTENNA, 21 . . . WIRELESS COMMUNICATION MODULE, 22 . . . DRIVE, 31 . . . REMOVABLE MEDIUM, 51 . . . MEASUREMENT INFORMATION ACQUIRING UNIT, 52 . . . REFERENCE ATMOSPHERIC PRESSURE SETTING UNIT, 53 . . . AREA DETERMINING UNIT, 54 . . . STATE DETERMINING UNIT, 55 . . . RECORDING CONTROL UNIT, 56 . . . OUTPUT CONTROL UNIT, 71 . . . HISTORY

DATA STORAGE UNIT, B . . . ATTACHMENT MEMBER, W1, W2 . . . WINDING PORTION, H1, H2 . . . BELT PASSAGE HOLE

What is claimed is:

1. A measuring device comprising:
   an atmospheric pressure sensor configured to detect an atmospheric pressure;
   a global positioning system (GPS) receiver configured to receive radio waves emitted from satellites; and
   a central processing unit (CPU) configured to:
      control the atmospheric pressure sensor to detect a reference atmospheric pressure;
      determine, based on first radio waves received by the GPS receiver, whether a position of the measuring device is closer to a sea than a coastline;
      in response to determining that the position of the measuring device is closer to the sea than the coastline,
         determine whether differences between the reference atmospheric pressure and first atmospheric pressures detected by the atmospheric pressure sensor are within a predetermined atmospheric pressure range;
         determine that the measuring device is located over water when the differences are within the predetermined atmospheric pressure range; and
         determine that the measuring device is located under water when the differences are not within the predetermined atmospheric pressure range; and
      perform different predetermined measurements on the basis of determining the measuring device is located over water and determining that the measuring device is located under water.

2. The measuring device according to claim 1,
   wherein the CPU is configured to determine whether the differences between the reference atmospheric pressure and the first atmospheric pressures using the first atmospheric pressures detected after determining that the position of the measuring device is closer to the sea than the coastline.

3. The measuring device according to claim 1,
   wherein the CPU is configured to perform a predetermined process as one of the different predetermined measurements on the basis of determining the measuring device is located over water.

4. The measuring device according to claim 1, further comprising at least one of an acceleration sensor, a gyro sensor, a geomagnetic sensor, and an altitude sensor configured to be controlled by the to perform the different predetermined measurements.

5. The measuring device according to claim 3,
   wherein the predetermined process is a process of acquiring GPS information from the GPS receiver.

6. The measuring device according to claim 3,
   wherein the predetermined process is a process of acquiring position information.

7. The measuring device according to claim 3,
   wherein the predetermined process is a process of acquiring speed information.

8. The measuring device according to claim 7,
   wherein in the predetermined process, the CPU is configured to:
      determine whether the speed information is equal to or higher than a predetermined speed; and
      determine that a user is in a state of riding a crest of a wave when the speed information is equal to or higher than the predetermined speed.

9. The measuring device according to claim 3,
   wherein the predetermined process is a process of recording history information in a memory.

10. The measuring device according to claim 1,
    wherein the measuring device is a device which is used in water sports.

11. The measuring device according to claim 10, wherein the water sport is surfing.

12. The measuring device according to claim 9,
    wherein the measuring device is a device which is used in water sports, and the history information is a track in a state in which the user is riding the crest of a wave.

13. The measuring device according to claim 1,
    wherein the CPU is configured to:
       perform, as one of the different predetermined measurements, measurements to acquire speed information when it is determined that the measuring device is located over water;
       determine whether the speed information is equal to or higher than a predetermined speed; and
       determine that a user is in the state of riding a crest of a wave and record history information in a memory when the speed information is equal to or higher than the predetermined speed.

14. The measuring device according to claim 13, further comprising:
    a wrist terminal comprising:
       body, wherein the CPU is arranged in the body;
       a belt configured to attach the body to a wrist of the user; and
    an attachment member is configured to attach the wrist terminal to a user's arm away from the wrist of the user.

15. The measuring device according to claim 14,
    wherein the CPU is configured to:
       determine a submerging state of the wrist terminal by setting the reference atmospheric pressure and detecting a variation from the reference atmospheric pressure when the wrist terminal is attached to the arm; and
       record a history of the water sports in the memory.

16. The measuring device according to claim 14, further comprising:
    wherein the attachment member is formed of a belt-shaped member having flexibility and comprises:
       a first winding portion configured to be wound on a lower arm of the user, wherein the first winding portion defines two belt passage holes through which the belt of the wrist terminal passes;
       a second winding portion configured to be wound on an upper arm of the user; and
       a fixing member that is fixable at an arbitrary position is provided in the first and second winding portions.

17. The measuring device according to claim 14, further comprising:
    a time piece circuit configured to generate a time signal from a signal generated by a system clock; and
    a communication unit configured to communicate with an external smartphone,
    wherein the CPU is configured to cooperate with the external smartphone via the communication unit.

18. The measuring device according to claim 1,
    wherein the CPU is configured to:
       in response to determining that the position of the measuring device is closer to the sea than the coastline, determine whether first atmospheric pressures detected by the atmospheric pressure sensor are at or below a first threshold for a first predetermined time period; and determine, based on second radio waves received by the GPS receiver, whether a speed of the measuring device is equal to or higher than a speed threshold;

in response to determining that the first atmospheric pressures detected are at or below the first threshold for the first predetermined time period and determining that the speed of the measuring device is equal to or higher than the speed threshold, determine that the a user of the measuring device is riding a crest of a wave and control a memory to record measurement information acquired by one or more measurement operations;

after determining that the user of the measuring device is riding the crest of the wave, determine whether second atmospheric pressures detected by the atmospheric pressure sensor are higher than a second threshold, where the second threshold is higher than the first threshold, for a predetermined number of times; and in response to determining that the second atmospheric pressures detected are higher than the second threshold for the predetermined number of times, determine that the user of the measuring device is located under water and control the memory to stop recording the measurement information acquired by the one or more measurement operations.

19. A measuring method for controlling a measuring device comprising an atmospheric pressure sensor configured to detect an atmospheric pressure and a global positioning system (GPS) receiver configured to receive radio waves emitted from satellites, wherein the measuring method comprises:

controlling the atmospheric pressure sensor to detect a reference atmospheric pressure;

determining, based on first radio waves received by the GPS receiver, whether a position of the measuring device is closer to a sea than a coastline;

in response to determining that the position of the measuring device is closer to the sea than the coastline, determining whether differences between the reference atmospheric pressure and first atmospheric pressures detected by the atmospheric pressure sensor are within a predetermined atmospheric pressure range;

determining that the measuring device is located over water when the differences are within the predetermined atmospheric pressure range; and determining that the measuring device is located under water when the differences are not within the predetermined atmospheric pressure range; and performing different predetermined measurements on the basis of determining the measuring device is located over water and determining that the measuring device is located under water.

20. A non-transitory computer-readable storage medium storing instructions for controlling a measuring device comprising an atmospheric pressure sensor configured to detect an atmospheric pressure and a global positioning system (GPS) receiver configured to receive radio waves emitted from satellites, wherein the instructions, when executed, cause a computer to at least perform:

control the atmospheric pressure sensor to detect a reference atmospheric pressure;

determine, based on first radio waves received by the GPS receiver, whether a position of the measuring device is closer to a sea than a coastline;

in response to determining that the position of the measuring device is closer to the sea than the coastline, determine whether differences between the reference atmospheric pressure and first atmospheric pressures detected by the atmospheric pressure sensor are within a predetermined atmospheric pressure range;

determine that the measuring device is located over water when the differences are within the predetermined atmospheric pressure range; and determine that the measuring device is located under water when the differences are not within the predetermined atmospheric pressure range; and perform different predetermined measurements on the basis of determining the measuring device is located over water and determining that the measuring device is located under water.

* * * * *

UNITED STATES PATENT AND TRADEMARK OFFICE
CERTIFICATE OF CORRECTION

Page 1 of 1

PATENT NO. : 11,020,646 B2
APPLICATION NO. : 16/140660
DATED : June 1, 2021
INVENTOR(S) : Takeshi Okada It is certified that error appears in the above-identified patent and that said Letters Patent is hereby corrected as shown below:

In the Claims

Column 13, Claim 4, Line 49 should read:
figured to be controlled to perform the different Column 15, Claim 18, Line 14 should read:
user of the measuring device is riding a crest of a Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*